US012596462B2

(12) United States Patent
Watanabe

(10) Patent No.: US 12,596,462 B2
(45) Date of Patent: *Apr. 7, 2026

(54) TERMINAL DEVICE AND POSITION DETECTION SENSOR INCLUDING SENSOR ELECTRODES AND LINEAR MEMBERS ARRANGED IN BETWEEN BACKGROUND

(71) Applicant: Wacom Co., Ltd., Saitama (JP)

(72) Inventor: Daisuke Watanabe, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/912,180

(22) Filed: Oct. 10, 2024

(65) Prior Publication Data

US 2025/0036249 A1    Jan. 30, 2025

Related U.S. Application Data

(63) Continuation of application No. 18/523,507, filed on Nov. 29, 2023, now Pat. No. 12,141,411, which is a (Continued)

(30) Foreign Application Priority Data

Jul. 2, 2019    (JP) ................................ 2019-123316

(51) Int. Cl.
  *G06F 3/046* (2006.01)
  *G06F 3/041* (2006.01)
(52) U.S. Cl.
  CPC .......... *G06F 3/046* (2013.01); *G06F 3/04166* (2019.05)

(58) Field of Classification Search
  CPC ............................ G06F 3/046; G06F 3/04166
  See application file for complete search history.

(56) References Cited

U.S. PATENT DOCUMENTS

2016/0098120 A1    4/2016  Miyake
2018/0300007 A1*  10/2018  Xu ......................... G06F 3/0445

FOREIGN PATENT DOCUMENTS

JP          H0583834 U    11/1993
JP          H0744304 A     2/1995
            (Continued)

OTHER PUBLICATIONS

International Search Report, dated Aug. 18, 2020, for International Application No. PCT/JP2020/020818. (2 pages).

*Primary Examiner* — Lisa S Landis
(74) *Attorney, Agent, or Firm* — Seed Intellectual Property Law Group LLP

(57) ABSTRACT

There is provided a terminal device including electronic paper and a position detection sensor disposed on a lower side of a display screen of the electronic paper and configured to detect a position indicated by an electronic pen on the display screen. The position detection sensor includes an insulating substrate having a first surface on a side facing display screen, and a plurality of first electrodes arranged in a first direction on the first surface of the insulating substrate. One or more first linear members extended in a direction along the first electrodes are arranged in each space between two of the first electrodes having a predetermined distance from each other in the first direction, among the plurality of first electrodes, on the first surface of the insulating substrate.

6 Claims, 5 Drawing Sheets

Related U.S. Application Data continuation of application No. 17/523,885, filed on Nov. 10, 2021, now Pat. No. 11,868,579, which is a continuation of application No. PCT/JP2020/020818, filed on May 27, 2020.

(56)                 References Cited

FOREIGN PATENT DOCUMENTS

| JP | H07295722 | A | 11/1995 |
|----|-----------|---|---------|
| JP | 2005134627 | A | 5/2005 |
| JP | 2009037119 | A | 2/2009 |
| JP | 2019060946 | A | 4/2019 |

* cited by examiner

FIG.1
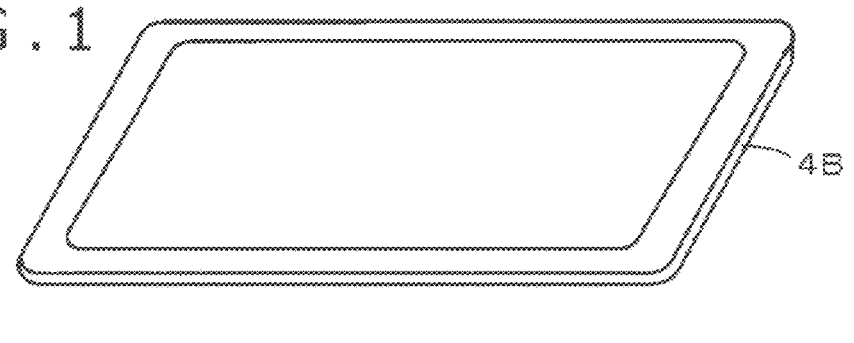
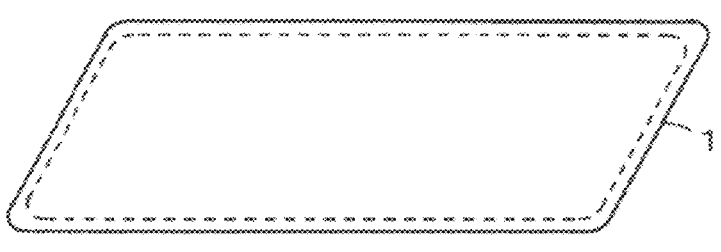
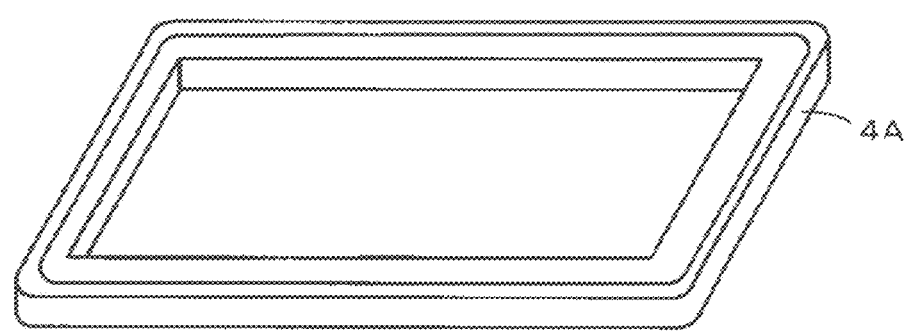

F I G . 2
200
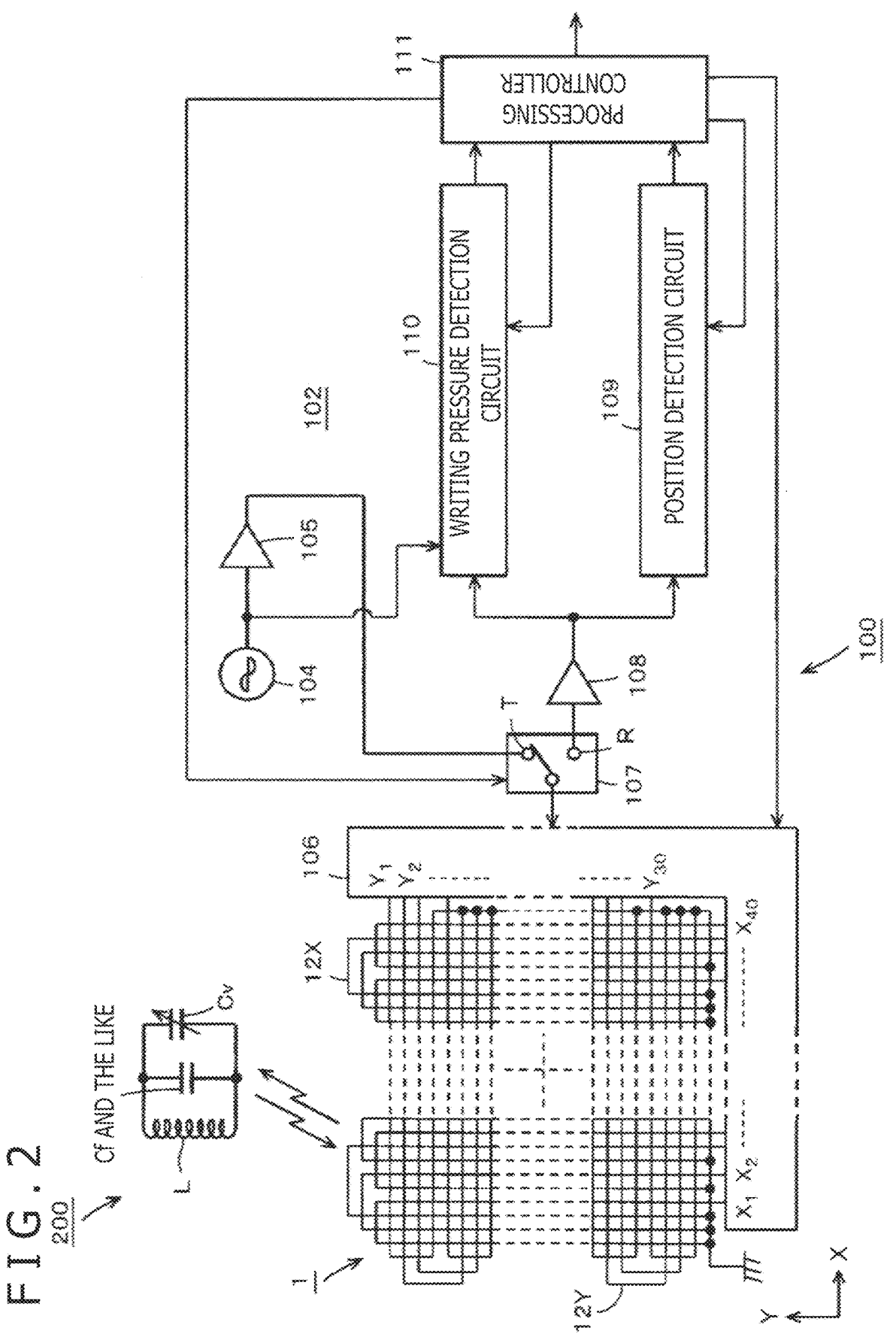

FIG.4A
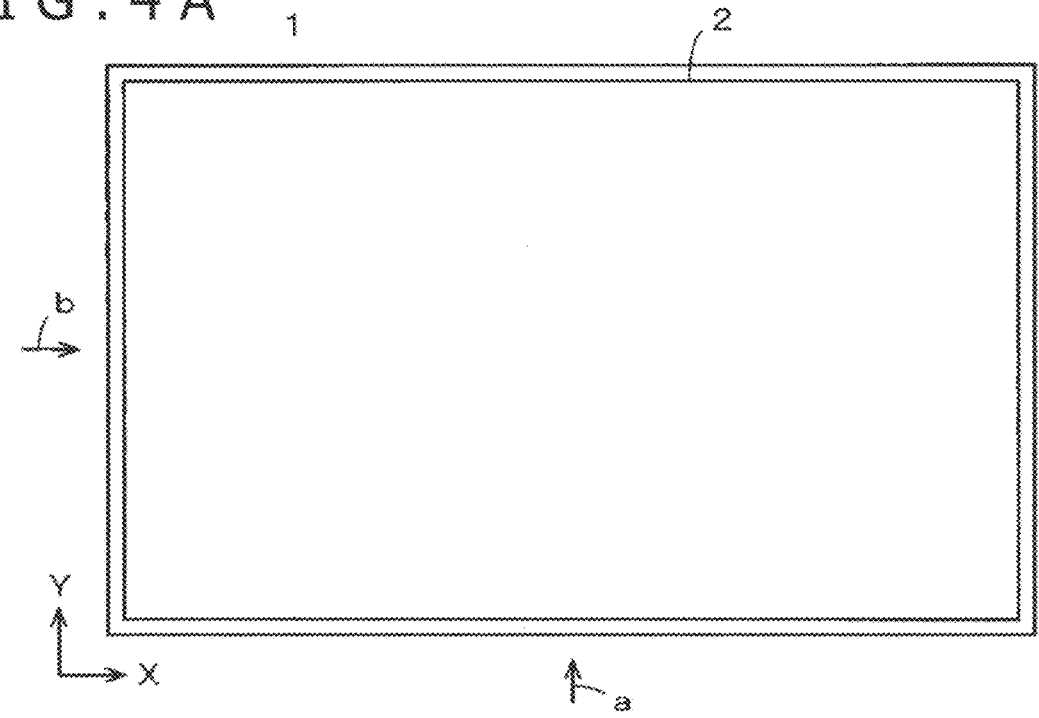
FIG.4B
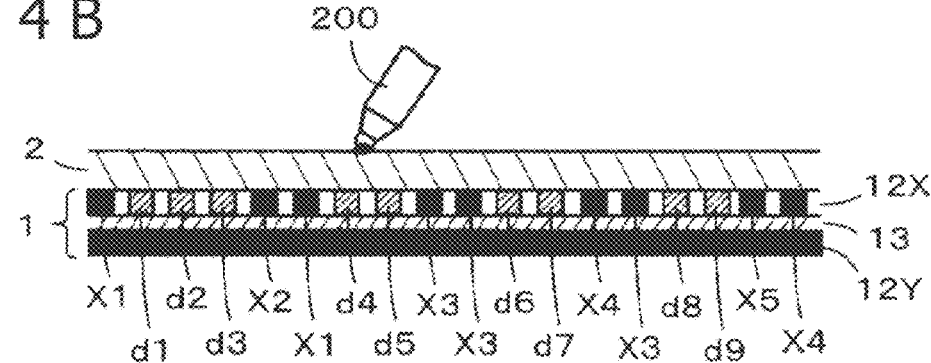
FIG.4C
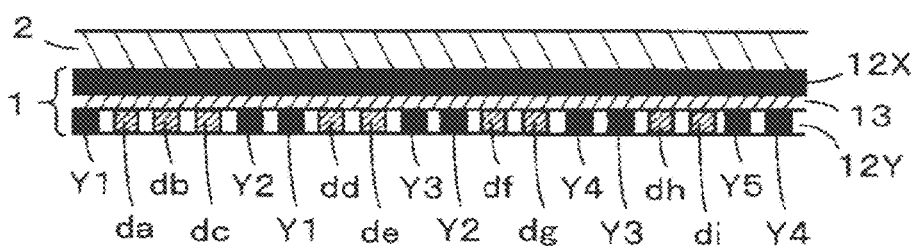
FIG.4D

TERMINAL DEVICE AND POSITION DETECTION SENSOR INCLUDING SENSOR ELECTRODES AND LINEAR MEMBERS ARRANGED IN BETWEEN BACKGROUND

BACKGROUND

Technical Field

The present disclosure relates to a terminal device including, for example, a thin display device and a position detection sensor that accepts input operation using a pen-type position indicator called an electronic pen, and to the position detection sensor included in the terminal device.

Description of the Related Art

Terminal devices such as high-functioning mobile phone terminals called smartphones and tablet personal computers (PCs) include a touch sensor to allow touch operation using a user's finger. The touch sensor includes transparent electrodes and is disposed on a display screen of a display device such as, for example, a liquid crystal display (LCD). Accordingly, the touch sensor and the display device constitute a touch panel as an input device. To allow more detailed operation and handwritten input of characters, figures, and symbols, some terminal devices can accept indication input made by an electronic pen (pen-type position indicator).

There are, for example, a capacitance type and an electromagnetic induction type as the type of position detection device that allows indication input using an electronic pen. The touch sensor described above is of the capacitance type. A position detection device of the capacitance type includes a sensor in which a plurality of linear conductors (line electrodes) are arranged in each of the X-axis direction and the Y-axis direction. When the electronic pen is brought close to the sensor, the position indicated by the electronic pen is detected based on the changes in capacitance (electric charges) that occur in the linear conductors constituting the sensor. The electronic pen of the capacitance type is also called, for example, a capacitive pen, which can be a pen-type position indicator simply having conductivity or can be a so-called active-type position indicator that is powered by a battery and transmits signals from an oscillation circuit. An example of an input device (a position detection device) including a coordinate detection sensor and an electronic pen of the capacitance type is disclosed in Japanese Patent Laid-Open No. Hei 07-295722.

A position detection device of the electromagnetic induction type includes a sensor in which a plurality of loop coils are arranged in each of the X-axis direction and the Y-axis direction. In a transmission period, current is sequentially supplied to the plurality of loop coils in the sensor to generate a magnetic field. In a reception period, the supply of the current is stopped and a magnetic field from the outside is received. The transmission period and the reception period are alternately provided. The corresponding electronic pen includes a resonant circuit including a coil and a capacitor. Current flowing through the coil in response to the magnetic field from the sensor generates a signal. The electronic pen transmits the signal to the sensor. In the reception period, the position detection device receives the signal through the sensor and detects the position indicated by the electronic pen. An example of an input device including a coordinate detection sensor and an electronic pen of the electromagnetic induction type is disclosed in Japanese Patent Laid-Open No. Hei 07-044304.

In many cases, an LCD described above or an organic electro-luminescence (EL) display is used as a display device of a terminal device. In recent years, so-called electronic paper, which is thin, light, and capable of displaying clear images, has been used as a display device of an electronic book reader or the like. Electronic paper is expected to continue to be widely used as a display device of various terminal devices. Various improvements have been made to electronic paper, and examples are disclosed in Japanese Patent Laid-Open No. 2009-037119 and Japanese Patent Laid-Open No. 2019-060946.

In the case where a terminal device allows both rough touch operation using a user's finger mainly for icon selection, for example, and detailed drawing operation using an electronic pen, the terminal device includes both a touch sensor of the capacitance type and a position detection sensor of the electromagnetic induction type. For example, as illustrated in FIG. 5A, an existing terminal device has a stacked structure in which a touch sensor 500 of the capacitance type is disposed on the upper side of a display device 600, and a position detection sensor 700 of the electromagnetic induction type is disposed on the lower side of the display device 600.

In recent years, it has been studied to provide a handier and low-cost mobile terminal that uses electronic paper as a display device and also uses a position detection device of the electromagnetic induction type to accept indication input using an electronic pen. In other words, such a mobile terminal includes a position detection sensor of the electromagnetic induction type but does not include a touch sensor of the capacitance type as an input device. One example of such a terminal device is illustrated in FIG. 5B. In this terminal device, electronic paper 600E is used as the display device and the position detection sensor 700 of the electromagnetic induction type is disposed on the lower side of the electronic paper 600E. In this case, the display screen of the electronic paper 600E serves as the operation surface, and the user performs indication input by bringing the electronic pen into contact with the display screen of the electronic paper 600E.

As illustrated in FIGS. 5A and 5B, the position detection sensor of the electromagnetic induction type is formed by stacking and arranging a plurality of loop coil groups 701 and 703, which are formed of conductive wires, on a predetermined substrate 702 such as a rigid substrate or a flexible substrate. Electronic paper is extremely thin compared to LCDs and organic EL displays. Consider a case where the user performs drawing input by bringing an electronic pen 200 into contact with the electronic paper 600E and moving the electronic pen 200 thereon. In this case, as illustrated in FIG. 5B, since the electronic paper 600E is thin and flexible, when the electronic pen 200 is moved on the electronic paper 600E, the pen tip of the electronic pen 200 moves upward at a position where the loop coil is present and moves downward at a position where the loop coil is not present.

Specifically, when the user performs drawing with the electronic pen 200 in contact with the electronic paper 600E, the distance between the pen tip of the electronic pen 200 and the sensor surface of the position detection sensor 700 of the electromagnetic induction type fluctuates. In this case, the level of the signal from the electronic pen 200 received by each loop coil of the loop coil group 701, which constitutes the position detection sensor 700, also fluctuates. As a result, as illustrated in FIG. 5C, the trajectory input by the electronic pen 200 and displayed on the electronic paper 600E may appear to be wavy. This is what is generally called a waving phenomenon. This deteriorates the quality of drawing input using the electronic pen 200, making it difficult to provide a mobile terminal that can support high-quality drawing input.

BRIEF SUMMARY

Therefore, it is desirable to be able to support high-quality drawing input using an electronic pen even when an extremely thin and flexible display device such as electronic paper is employed.

In order to solve the problem described above, there is provided a terminal device including electronic paper and a position detection sensor disposed on a lower side of a display screen of the electronic paper and configured to detect a position indicated by an electronic pen on the display screen. The position detection sensor includes an insulating substrate having a first surface on a side facing the display screen, and a plurality of first electrodes arranged in a first direction on the first surface of the insulating substrate. One or more first linear members extended in a direction along the first electrodes are arranged in each space between two of the first electrodes having a predetermined distance from each other in the first direction, among the plurality of first electrodes, on the first surface of the insulating substrate.

This terminal device includes electronic paper and a position detection sensor disposed on a lower side of a display screen of the electronic paper. The position detection sensor includes an insulating substrate having a first surface on a side facing the display screen, and a plurality of first electrodes arranged in a first direction on the first surface of the insulating substrate. One or more first linear members extended in a direction along the first electrodes are arranged in each space between two of the first electrodes having a predetermined distance from each other in the first direction, among the plurality of first electrodes, on the first surface of the insulating substrate.

With this configuration, it is possible to prevent the electronic pen performing drawing input by being brought into contact with and moved on the display screen of the electronic paper from moving up and down in a direction perpendicular to the display screen at a position where the first electrode is present and at a position where the first electrode is not present. This configuration, therefore, prevents what is generally called a waving phenomenon, in which, when the user draws a line by bringing the electronic pen into contact with the display screen of the electronic paper and moving the electronic pen thereon in the direction intersecting the first electrodes, the drawn line appears to be wavy. Accordingly, the terminal device that can support high-quality drawing input can be provided.

BRIEF DESCRIPTION OF THE SEVERAL VIEWS OF THE DRAWINGS

FIG. 1 is a diagram of an example configuration of a terminal device according to an embodiment;

FIG. 2 is a diagram of an example configuration of a position detection device included in the terminal device illustrated in FIG. 1 and of an example configuration of an electronic pen used with the position detection device;

FIGS. 4A to 4D are views for describing an example configuration of the position detection sensor according to the embodiment.

DETAILED DESCRIPTION

Figure 3:
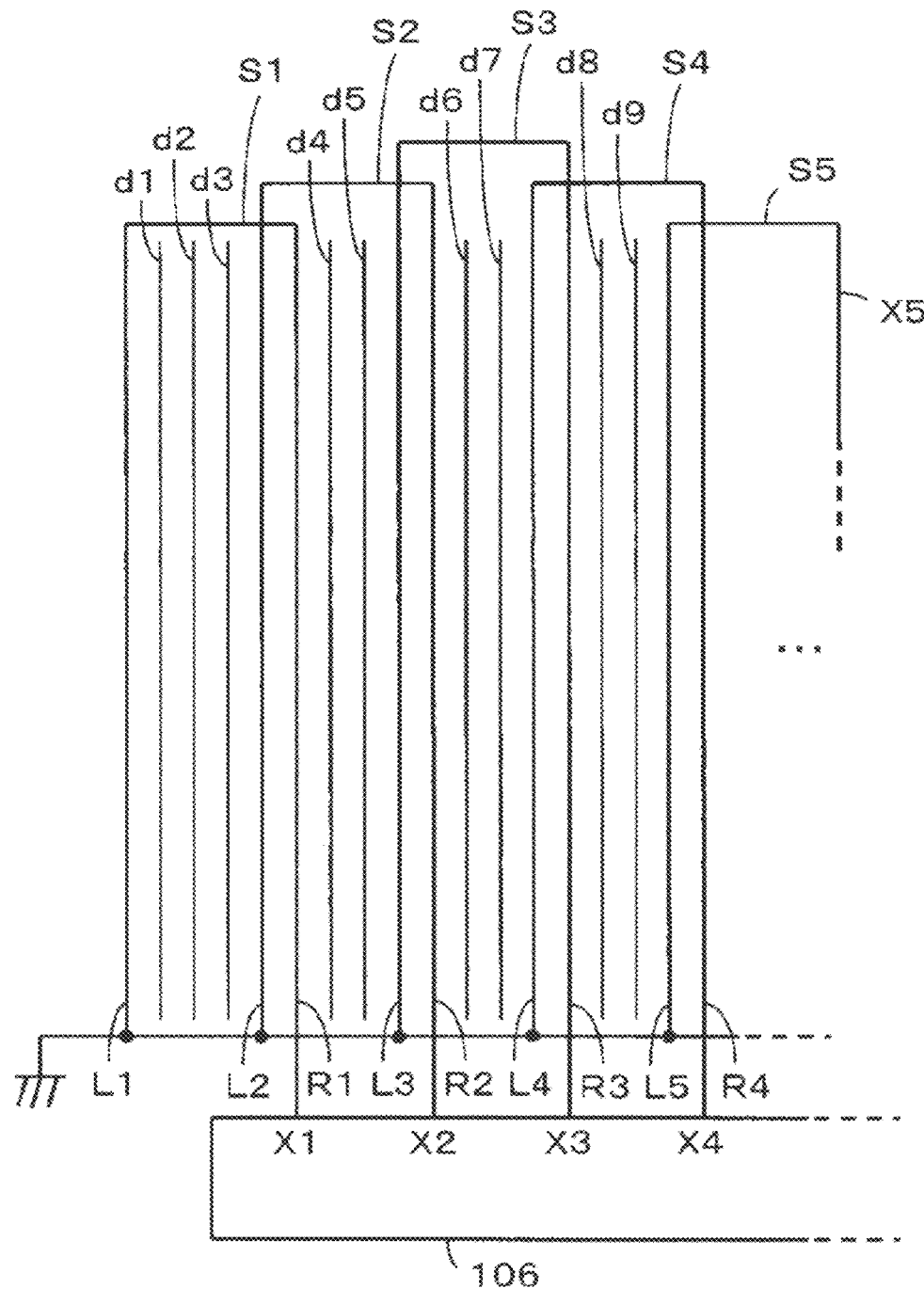
FIG. 3 is a diagram of an example configuration of a position detection sensor according to the embodiment.

Example of Configuration of Electronic Apparatus Including Display Device and Position Detection Sensor FIG. 1 is a diagram of an example configuration of a terminal device according to the present embodiment. As illustrated in FIG. 1, electronic paper 2 as a display device is positioned on the upper side of a position detection sensor 1, while a motherboard 3 is positioned on the lower side of the position detection sensor 1. The motherboard 3, the position detection sensor 1, and the electronic paper 2 are stacked in this order from the bottom, stored in a casing 4A, and sealed from the top by a front panel 4B, constituting the terminal device according to the present embodiment.

The electronic paper 2 refers to, among display media that possess visibility and portability which are advantages of paper, any display medium that can electrically rewrite display contents. Various display methods such as an electrophoresis method and an electronic powder method are available as the display method of the electronic paper 2. The electronic paper 2 is thinner and cheaper than an LCD and an EL display. The motherboard 3 is what is generally called a printed circuit board that includes, for example, a position detection circuit to which the position detection sensor 1 is connected, a power supply circuit, a control circuit, a display circuit for the electronic paper 2, and an interface circuit serving as the interface with an external device.

In the present embodiment, the position detection sensor 1 is of an electromagnetic induction type and is connected to the position detection circuit formed in the motherboard 3. The position detection sensor 1 and the position detection circuit of the motherboard 3 constitute a position detection device. The position detection sensor 1 corresponds to the entire surface of the display screen of the electronic paper 2. No matter which position on the display screen of the electronic paper 2 is indicated by an electronic pen, the position detection sensor 1 can detect the position indicated by the electronic pen.

Accordingly, the user can perform drawing input into the terminal device configured in this manner by bringing the electronic pen into contact with the display screen of the electronic paper 2 and moving the electronic pen thereon. Needless to say, the user can also select an icon, for example, by bringing the electronic pen into contact with the display screen of the electronic paper 2. In this manner, the terminal device according to the present embodiment includes the electronic paper 2 serving as the display device and the position detection sensor 1 of the electromagnetic induction type disposed on the lower side of the electronic paper 2.

Therefore, a touch sensor of a capacitance type is not present on the upper side of the electronic paper 2. Accordingly, the user performs various indication inputs by directly bringing the electronic pen into contact with the display screen of the electronic paper 2. That is, other than operation buttons such as a power supply button, the main input device included in the electronic apparatus according to the present embodiment is only the position detection device of the electromagnetic induction type.

Example of Configuration of Position Detection Device

FIG. 2 is a diagram of an example configuration of a position detection device 100 and an example configuration of an electronic pen 200. The position detection device 100 includes the position detection sensor 1 and a position detection circuit 102. In the present embodiment, the position detection device 100 and the electronic pen 200 are of the electromagnetic induction type. Specifically, as illustrated in the upper left of FIG. 2, the electronic pen 200 includes a resonant circuit in which various elements are connected in parallel including a coil L for transmitting and receiving signals, a writing pressure detector Cv which is a variable-capacitance capacitor, a resonant capacitor Cf, and the like.

The position detection device 100 includes the position detection sensor 1 formed by stacking an X-axis direction loop coil group 12X and a Y-axis direction loop coil group 12Y. Each of loop coils X1, X2, . . . , X40 of the X-axis direction loop coil group 12X and loop coils Y1, Y2, . . . , Y30 of the Y-axis direction loop coil group 12Y may have one turn or two or more turns. Note that the position detection sensor 1 is illustrated in FIG. 2 in a simplified form, and the detailed configuration of the position detection sensor 1 will be described later. The position detection sensor 1 is connected to the position detection circuit 102, to thereby form the position detection device 100.

In the present embodiment, the position detection circuit 102 is formed on the motherboard 3. The position detection circuit 102 includes an oscillator 104, a current driver 105, a selection circuit 106, a switching connection circuit 107, a reception amplifier 108, a position detection circuit 109, a writing pressure detection circuit 110, and a processing controller 111. As illustrated in FIG. 2, the X-axis direction loop coil group 12X and the Y-axis direction loop coil group 12Y of the position detection sensor 1 are connected to the selection circuit 106. The selection circuit 106 sequentially selects one loop coil among the two loop coil groups 12X and 12Y according to the control from the processing controller 111.

The processing controller 111 includes a microprocessor. The processing controller 111 controls the selection of the loop coil in the selection circuit 106, the switching performed by the switching connection circuit 107, the processing timing in the position detection circuit 109 and the writing pressure detection circuit 110.

The oscillator 104 generates an alternating current (AC) signal of a frequency f0. The oscillator 104 supplies the generated AC signal to the current driver 105 and the writing pressure detection circuit 110. The current driver 105 converts the AC signal supplied from the oscillator 104 into current and supplies the current to the switching connection circuit 107. According to the control from the processing controller 111, the switching connection circuit 107 switches a connection destination (a transmission-side terminal T, a reception-side terminal R) to which the loop coil selected by the selection circuit 106 is connected. Of these connection destinations, the transmission-side terminal T is connected to the current driver 105, while the reception-side terminal R is connected to the reception amplifier 108.

The switching connection circuit 107 switches the connection destination to the transmission-side terminal T in the transmission period and to the reception-side terminal R in the reception period. During the transmission period, the loop coil that has received the current from the current driver 105 through the transmission-side terminal T generates a magnetic field, which is then transmitted to the electronic pen 200 and acts on the resonant circuit of the electronic pen 200. In response, the resonant circuit of the electronic pen

200 generates a position indication signal (a radio wave) and transmits the position indication signal to the position detection sensor 1.

On the other hand, in the reception period, the loop coil selected by the selection circuit 106 is connected to the reception amplifier 108 through the reception-side terminal R. While the magnetic field from the electronic pen 200 acts on this loop coil, an induction voltage is generated in the loop coil. This induction voltage is transmitted to the reception amplifier 108 through the selection circuit 106 and the switching connection circuit 107. The reception amplifier 108 amplifies the induction voltage supplied from the loop coil and supplies the amplified induction voltage to the position detection circuit 109 and the writing pressure detection circuit 110.

That is, an induction voltage is generated in each of the loop coils of the X-axis direction loop coil group 12X and the Y-axis direction loop coil group 12Y by the radio wave transmitted from the electronic pen 200. Therefore, the position detection circuit 109 detects the induction voltage (received signal) generated in the loop coil, converts the detected output signal into a digital signal, and outputs the digital signal to the processing controller 111. The processing controller 111 calculates the coordinate values of the position indicated by the electronic pen 200 in the X-axis direction and the Y-axis direction based on the digital signal received from the position detection circuit 109, that is, the level of the voltage value of the induction voltage generated in each loop coil.

The writing pressure detection circuit 110 detects the output signal of the reception amplifier 108 in synchronization with the AC signal from the oscillator 104 to obtain a signal with a level corresponding to the phase difference (frequency shift) between these signals. The writing pressure detection circuit 110 then converts the signal corresponding to the phase difference (frequency shift) into a digital signal and outputs the digital signal to the processing controller 111. The processing controller 111 detects the writing pressure applied to the electronic pen 200 based on the digital signal from the writing pressure detection circuit 110, that is, the level of the signal corresponding to the phase difference (frequency shift) between the transmitted radio wave and the received radio wave.

In this manner, the position detection circuit 102 switches between the signal transmission period and the signal reception period. In the transmission period, the position detection circuit 102 supplies driving power to the electronic pen 200 to drive the electronic pen 200. In the reception period, the position detection circuit 102 receives a signal from the electronic pen 200 to detect the indicated position and the writing pressure. The indicated position and writing pressure that have been detected are supplied to the control circuit of the motherboard 3, so that processing corresponding to the icon displayed at the indicated position can be performed or the drawing image corresponding to the indication input can be displayed on the electronic paper 2.

Example of Configuration of Position Detection Sensor 1

FIG. 3 is a diagram of an example configuration of the position detection sensor 1, illustrating an enlarged view of a left-end portion of the X-axis direction loop coil group 12X of the position detection sensor 1 illustrated in FIG. 2. In FIG. 3, the Y-axis direction loop coil group 12Y is not illustrated to simplify the description. As illustrated in FIG. 3, the plurality of loop coils X1, X2, X3, X4, . . . , which constitute the X-axis direction loop coil group 12X, are arranged at predetermined intervals in the X-axis direction on the surface of the position detection sensor 1 (the first surface of the position detection sensor 1) that faces the electronic paper 2. In FIG. 3, the horizontal direction of FIG. 3 is the X-axis direction while the vertical direction of FIG. 3 is the Y-axis direction.

In the present embodiment, as illustrated in FIG. 3, each of the loop coils X1, X2, X3, X4, . . . has a single turn formed in a rectangular shape. Each of the loop coils X1, X2, X3, X4, . . . has two, left and right, long sides, which are extended in the Y-axis direction intersecting the X-axis direction, and a short side, which is extended in the X-axis direction and connects these long sides. For example, the loop coil X1 has two, left and right, long sides L1 and R1 and a short side S1, while the loop coil X2 has two, left and right, long sides L2 and R2 and a short side S2. In the present embodiment, as illustrated in FIG. 3, adjacent loop coils are arranged so as to have an overlapping portion. Further, one end of each of the loop coils X1, X2, X3, X4, . . . is connected to the selection circuit 106, while the other end is grounded.

In the case of an existing position detection sensor of the electromagnetic induction type, nothing is arranged, that is, there is an empty space between the left long side L1 of the loop coil X1 and the left long side L2 of the loop coil X2, and between the right long side R1 of the loop coil X1 and a left long side L3 of the loop coil X3. Similarly, nothing is arranged, that is, there is an empty space between the right long side R2 of the loop coil X2 and a left long side L4 of the loop coil X4, and between a right long side R3 of the loop coil X3 and a left long side L5 of the loop coil X5.

Figure 5A:
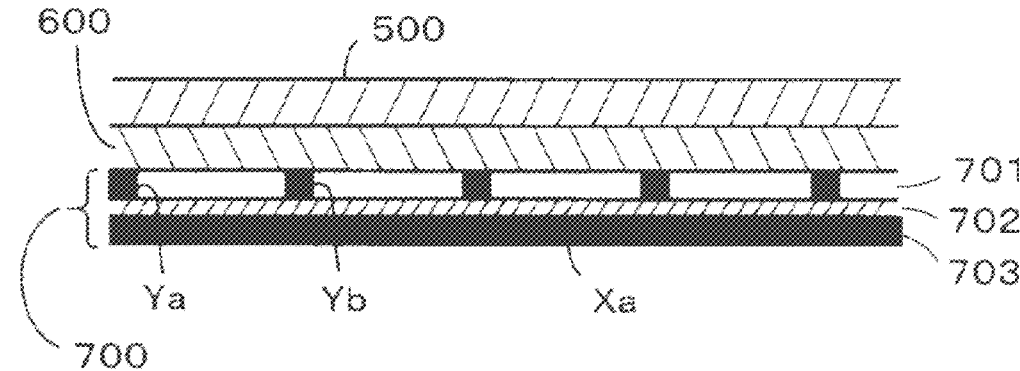
FIGS. 5A to 5C are views for describing an example configuration of an existing terminal device and a possible problem that may occur with the terminal device using electronic paper.
Figure 5B:
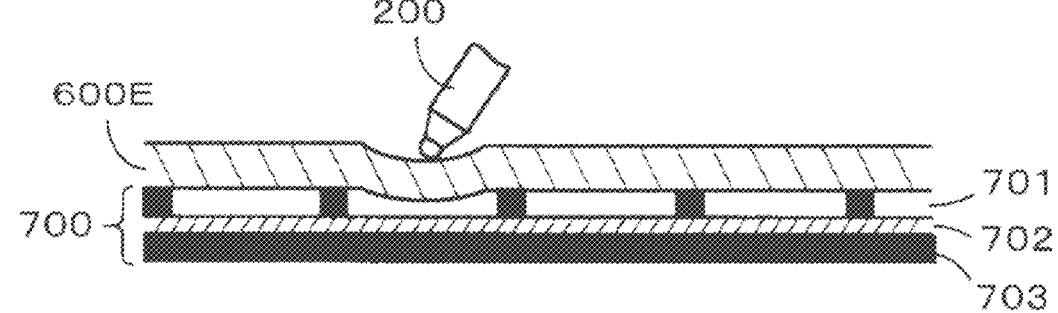
Figure 5C:

In this manner, there has been a relatively wide empty space between each long side. This empty space is not a problem for the detection of the position indicated by the electronic pen 200. However, as described with reference to FIG. 5B, this causes the pen tip of the electronic pen 200 to move up and down when the user performs drawing by moving the electronic pen 200 in contact with the display screen of the electronic paper 2. As a result, this may cause what is generally called a waving phenomenon, in which a drawn line appears to be wavy. The waving phenomenon is especially likely to occur in a terminal device that uses the extremely thin and flexible electronic paper 2 as the display device.

Therefore, as illustrated in FIG. 3, in the position detection sensor 1 according to the present embodiment, linear members d1, d2, and d3 are arranged between the left long side L1 of the loop coil X1 and the left long side L2 of the loop coil X2. Further, linear members d4 and d5 are arranged between the right long side R1 of the loop coil X1 and the left long side L3 of the loop coil X3. Similarly, linear members d6 and d7 are arranged between the right long side R2 of the loop coil X2 and the left long side LA of the loop coil X4, and linear members d8 and d9 are arranged between the right long side R3 of the loop coil X3 and the left long side L5 of the loop coil X5.

In this manner, with respect to all of the loop coils constituting the X-axis direction loop coil group 12X, when a space between adjacent long sides is large enough to sink the pen tip of the electronic pen 200 therein, the predetermined linear members are arranged in this space, as denoted by the linear members d1, d2, d3, . . . . The predetermined linear members such as the linear members d1, d2, d3, . . . , may be formed of, for example, a conductive material such as metal or may be formed of, for example, a non-conductive material such as resin. No matter what material the linear members are formed of, the predetermined linear members are not connected to the loop coils or the circuits of the position detection circuit 102. This configuration smooths the sensor surface of the position detection sensor 1 and prevents the pen tip of the electronic pen 200 from sinking substantially.

When the empty space between adjacent long sides is not large enough to sink the pen tip of the electronic pen 200 therein, such as a space between the left long side L2 of the loop coil X2 and the right long side R1 of the loop coil X1, the predetermined linear members do not need to be arranged therein. Similarly, the predetermined linear members do not need to be arranged between the left long side L3 of the loop coil X3 and the right long side R2 of the loop coil X2 and between the left long side L4 of the loop coil X4 and the right long side R3 of the loop coil X3.

The description has been made taking the X-axis direction loop coil group 12X as an example here. In the position detection sensor 1 according to the present embodiment, the predetermined linear members may also be similarly arranged for the Y-axis direction loop coil group 12Y, which is disposed on a second surface opposite to the first surface on which the X-axis direction loop coil group 12X is disposed. That is, as in the case of the X-axis direction loop coil group 12X, with respect to all of the loop coils Y1, Y2, Y3, . . . constituting the Y-axis direction loop coil group 12Y, when an empty space between adjacent long sides has a predetermined size, the predetermined linear members are arranged in each such an empty space.

Since the Y-axis direction loop coil group 12Y is formed on the second surface of an insulating layer (insulating substrate) 13, the Y-axis direction loop coil group 12Y is considered to have less influence than the X-axis direction loop coil group 12X, which is formed on the first surface. However, this configuration contributes to further smoothing of the sensor surface of the position detection sensor 1. The empty spaces having the predetermined size in the Y-axis direction loop coil group 12Y are similar to the empty spaces in the X-axis direction loop coil group 12X. In other words, the spaces that may cause the pen tip of the electronic pen 200 in contact with the display screen of the electronic paper 2 to move up and down in the direction perpendicular to the display screen, in case the Y-axis direction loop coil group 12Y is formed on the first surface of the insulating layer 13, are the empty spaces having the predetermined size according to the present disclosure.

FIGS. 4A to 4D are views for describing an example configuration of the position detection sensor 1. Specifically, FIG. 4A is a top view when the electronic paper 2 is stacked and disposed on the position detection sensor 1. FIG. 4B is a cross-sectional view of a left end portion of the position detection sensor 1 and the electronic paper 2 when viewed from arrow "a" of FIG. 4A. FIG. 4C is a view for describing an example of a drawing image (a pen-drawn image) when a straight line is drawn with the electronic pen 200 in contact with the display screen of the electronic paper 2. FIG. 4D is a cross-sectional view of a left end portion of the position detection sensor 1 and the electronic paper 2 when viewed from arrow "b" of FIG. 4A.

As illustrated in FIG. 4A, the position detection sensor 1 is disposed on the lower side of the electronic paper 2, and the sensor surface of the position detection sensor 1 corresponds to the entire surface of the display screen of the electronic paper 2. This means that no matter which position on the display screen of the electronic paper 2 is indicated by the electronic pen 200, the indicated position can be detected appropriately.

As illustrated in FIG. 4B, viewing the cross-section of the left end portion of the position detection sensor 1 and the electronic paper 2 from arrow "a" of FIG. 4A, the X-axis direction loop coil group 12X is formed on the surface (first surface) of the insulating layer 13 that faces the electronic paper 2. Further, the Y-axis direction loop coil group 12Y is formed on the surface (second surface) opposite to the surface (first surface) of the insulating layer 13 that faces the electronic paper 2.

As described with reference to FIG. 3 and also illustrated in FIG. 4B, the linear members d1, d2, and d3 are arranged between the left long side L1 of the loop coil X1 and the left long side L2 of the loop coil X2. Further, the linear members d4 and d5 are arranged between the right long side R1 of the loop coil X1 and the left long side L3 of the loop coil X3. Similarly, the linear members d6 and d7 are arranged between the right long side R2 of the loop coil X2 and the left long side LA of the loop coil X4, and the linear members d8 and d9 are arranged between the right long side R3 of the loop coil X3 and the left long side L5 of the loop coil X5.

In this manner, for the X-axis direction loop coil group 12X formed on the first surface of the insulating layer 13, the predetermined linear members are arranged in each empty space where the distance between the long sides has a predetermined distance and therefore the pen tip of the electronic pen 200 may move up and down to thereby cause the waving phenomenon. With this configuration, as illustrated in FIG. 4B, even when the user performs drawing input by bringing the pen tip of the electronic pen 200 into contact with the display screen of the electronic paper 2, the pen tip of the electronic pen 200, indicated by a black dot, does not sink substantially in the direction perpendicular to the display screen of the electronic paper 2.

For this reason, when a straight line is drawn with the pen tip of the electronic pen 200 in contact with the display screen of the electronic paper 2, the pen tip of the electronic pen 200 does not move up and down in the direction that intersects the display screen. Even if the pen tip of the electronic pen 200 moves up and down, the up-and-down movement is very small. This ensures that, as illustrated in FIG. 4C, the image of the straight line drawn here (the pen-drawn image) is a high-quality drawing image with no waviness or no noticeable waviness.

As illustrated in FIG. 4D, viewing the cross-section of the left end portion of the position detection sensor 1 and the electronic paper 2 from arrow "b" of FIG. 4A, the Y-axis direction loop coil group 12Y is formed on the second surface of the insulating layer 13. The Y-axis direction loop coil group 12Y is formed by arranging the loop coils in the direction intersecting the X-axis direction loop coil group 12X. In the position detection sensor 1 according to the present embodiment, the predetermined linear members are also arranged for the Y-axis direction loop coil group 12Y in a similar manner to the X-axis direction loop coil group 12X described above.

That is, as illustrated in FIG. 4D, linear members da, db, and dc are arranged between the left long side of the loop coil Y1 and the left long side of the loop coil Y2. Further, linear members dd and de are arranged between the right long side of the loop coil Y 1 and the left long side of the loop coil Y3. Similarly, linear members df and dg are arranged between the right long side of the loop coil Y2 and the left long side of the loop coil Y4, and linear members dh and di are arranged between the right long side of the loop coil Y3 and the left long side of the loop coil Y5.

In this manner, not only for the X-axis direction loop coil group 12X arranged on the first surface of the insulating layer 13 that faces the electronic paper 2, but also for the Y-axis direction loop coil group 12Y arranged on the second surface of the insulating layer 13, the predetermined linear members are arranged in the empty spaces. This configuration can further smooth the sensor surface of the position detection sensor 1, thereby making drawing smoother. Accordingly, drawing input can be performed with high quality even in the terminal device using the electronic paper 2 as the display device.

Effects of the Embodiment

As described above, in the X-axis direction loop coil group 12X of the position detection sensor 1 according to the present embodiment, when there is a predetermined empty space between the long sides arranged in the direction in which each loop coil is arranged, one or more predetermined linear members are arranged in this empty space. Similarly, in the Y-axis direction loop coil group 12Y, when there is a predetermined empty space between the long sides arranged in the direction in which each loop coil is arranged, one or more predetermined linear members are arranged in this empty space.

This configuration can smooth the sensor surface of the position detection sensor 1. Therefore, even when the user performs drawing input by bringing the electronic pen 200 into contact with the display screen of the electronic paper 2 disposed on the upper side of the position detection sensor 1 and moving the electronic pen 200 thereon, the pen tip of the electronic pen 200 does not move up and down significantly. This configuration can therefore prevent the so-called waving phenomenon from occurring.

Therefore, even if the terminal device is configured such that the extremely thin and flexible electronic paper 2 is disposed as the display device on the position detection sensor 1, drawing input using the electronic pen 200 can be performed with high quality in this terminal device. That is, even if the terminal device is configured using the electronic paper 2 as the display device, the terminal device that supports high-quality and detailed drawing input can be provided.

Modifications

Although adjacent loop coils are arranged so as to partially overlap each other in the embodiment described above, the configuration is not limited thereto. As long as the position indicated by the electronic pen can be appropriately detected, adjacent loop coils do not need to overlap each other.

The number of predetermined linear members arranged between the long sides of the loop coils can be any number suitable for the size of the empty space present between the long sides of the loop coils.

When the predetermined linear members arranged between the long sides of the loop coils are formed of a conductive material, disposing an appropriate number of predetermined linear members can efficiently supply power to the electronic pen 200 and also efficiently receive a signal from the electronic pen 200.

Although the position detection sensor 1 of the electromagnetic induction type is employed in the embodiment described above, the type of the position detection sensor 1 is not limited thereto. The position detection sensor according to the embodiment of the present disclosure can also be applied to a position detection sensor of an active capacitive coupling type that is disposed on the lower side of the electronic paper 2 used as the display device.

The position detection sensor of the active capacitive coupling type includes a sensor in which a plurality of linear conductors (line electrodes) are arranged in each of the X-axis direction and the Y-axis direction. The position detection sensor detects the position indicated by a capacitive pen according to the changes in capacitance (electric charges) generated in the linear conductors when the sensor receives a signal transmitted from the capacitive pen. In such a position detection sensor of the active capacitive coupling type, predetermined linear members can also be arranged in the spaces between the linear conductors arranged in each of the X-axis direction and the Y-axis direction, so that the up-and-down movement of the pen tip of the electronic pen can be reduced.

In the embodiments described above, for both the X-axis direction loop coil group 12X and the Y-axis direction loop coil group 12Y, the predetermined linear members are arranged in the empty spaces between the long sides. Similarly, in the active capacitive sensor, the predetermined linear members are also arranged in the spaces between the linear conductors arranged in each of the X-axis direction and the Y-axis directions. However, the configurations are not limited thereto. The predetermined linear members may be arranged, at least, in the empty spaces between adjacent long sides for the loop coil group arranged on the side facing the electronic paper, or in the empty spaces between adjacent linear conductors for the linear conductor group arranged on the side facing the electronic paper.

However, in order to smooth the sensor surface of the position detection sensor, it may be desirable that the predetermined linear members be also disposed for the loop coil group or the linear conductor group formed on the surface that does not face the electronic paper.

Although the electronic paper 2 is employed as the display device in the embodiments described above, the display device is not limited thereto. The present disclosure can be applied, as with the electronic paper, when any of various thin and flexible display devices is employed regardless of what display method is employed. That is, the present invention can be applied when any of various display devices is employed that may be affected, upon indication input using an electronic pen, by an unsmooth sensor surface of a position detection sensor disposed on the lower side of the display device.

It is to be noted that the embodiments of the present disclosure are not limited to the foregoing, and that various changes can be made according to the principles disclosed herein.

The invention claimed is:

1. A terminal device comprising:
a display device; and
a position detection sensor disposed on a lower side of a display screen of the display device and configured to detect a position indicated by an electronic pen on the display screen,
wherein the position detection sensor includes:
an insulating substrate having a first surface on a side facing the display screen, and
a plurality of first electrodes spaced apart along a first direction on the first surface of the insulating substrate, and
one or more first linear members extended in a direction along the first electrodes and arranged in each space between two of the first electrodes having a predetermined distance from each other in the first direction, among the plurality of first electrodes, on the first surface of the insulating substrate,
wherein each of the plurality of first electrodes of the position detection sensor is of an electromagnetic induction type and configured as a loop coil having at least two long sides and a short side connecting the at least two long sides.

2. The terminal device according to claim 1,
wherein the position detection sensor includes a plurality of second electrodes spaced apart along a second direction on a second surface of the insulating substrate opposite to the first surface, the second direction intersecting the first direction, and
one or more second linear members extended in a direction along the second electrodes are arranged in each space between two of the second electrodes having a predetermined distance from each other in the second direction, among the plurality of second electrodes, on the second surface of the insulating substrate.

3. The terminal device according to claim 2,
wherein each of the plurality of second electrodes of the position detection sensor is of an electromagnetic induction type and configured as a loop coil having at least two long sides and a short side connecting the at least two long sides, and
the one or more second linear members are arranged in each space between two of the long sides having the predetermined distance from each other in the second direction, among the long sides of a plurality of the loop coils forming the plurality of second electrodes.

4. A position detection sensor disposed on a lower side of a display screen of a display device and configured to detect a position indicated by an electronic pen on the display screen, the position detection sensor comprising:
an insulating substrate having a first surface on a side facing the display screen;
a plurality of first electrodes arranged in a first direction on the first surface of the insulating substrate; and
one or more first linear members extended in a direction along the first electrodes and arranged in each space between two of the first electrodes having a predetermined distance from each other in the first direction, among the plurality of first electrodes, on the first surface of the insulating substrate,
wherein each of the plurality of first electrodes is of an electromagnetic induction type and configured as a loop coil having at least two long sides and a short side connecting the at least two long sides.

5. The position detection sensor according to claim 4, further comprising:
a plurality of second electrodes arranged in a second direction on a second surface of the insulating substrate opposite to the first surface, the second direction intersecting the first direction; and
one or more second linear members extended in a direction along the second electrodes and arranged in each space between two of the second electrodes having a predetermined distance from each other in the second direction, among the plurality of second electrodes, on the second surface of the insulating substrate.

6. The position detection sensor according to claim 5,
wherein each of the plurality of second electrodes is of an electromagnetic induction type and configured as a loop coil having at least two long sides and a short side connecting the at least two long sides, and
the one or more second linear members are arranged in each space between two of the long sides having the predetermined distance from each other in the second direction, among the long sides of a plurality of the loop coils forming the plurality of second electrodes.

* * * * *